(12) United States Patent
Bianchi et al.

(10) Patent No.: US 11,101,522 B2
(45) Date of Patent: Aug. 24, 2021

(54) METHODS OF INERTING LITHIUM-CONTAINING BATTERIES AND ASSOCIATED CONTAINERS

(71) Applicant: THE BOEING COMPANY, Chicago, IL (US)

(72) Inventors: Maurice P. Bianchi, Chicago, IL (US); David Kirshman, Chicago, IL (US)

(73) Assignee: The Boeing Company, Chicago, IL (US)

( * ) Notice: Subject to any disclaimer, the term of this patent is extended or adjusted under 35 U.S.C. 154(b) by 10 days.

(21) Appl. No.: 16/436,229

(22) Filed: Jun. 10, 2019

(65) Prior Publication Data

US 2019/0296302 A1 Sep. 26, 2019

Related U.S. Application Data

(60) Division of application No. 15/338,936, filed on Oct. 31, 2016, now Pat. No. 10,374,201, which is a (Continued)

(51) Int. Cl.
*H01M 50/24* (2021.01)
*H01M 10/42* (2006.01)
(Continued)

(52) U.S. Cl.
CPC .............. *H01M 50/24* (2021.01); *B65B 7/02* (2013.01); *B65B 7/16* (2013.01); *B65B 29/00* (2013.01); *B65B 31/00* (2013.01); *B65D 81/2076* (2013.01); *B65D 81/2084* (2013.01); *H01M 10/0525* (2013.01); *H01M 10/4235* (2013.01);
(Continued)

(58) Field of Classification Search
None
See application file for complete search history.

(56) References Cited

U.S. PATENT DOCUMENTS 3,459,596 A 8/1969 Lord et al.
7,270,910 B2 9/2007 Yahnker et al.
(Continued)

FOREIGN PATENT DOCUMENTS

CN 1442928 A 9/2003
CN 102326285 A 1/2012
(Continued)

OTHER PUBLICATIONS

Groff et al., Steady Metal Combustor as a Closed Thermal Energy Source, J Hydrology, 12, 63-70 (Year: 1978).*
(Continued)

*Primary Examiner* — Daniel S Gatewood
(74) *Attorney, Agent, or Firm* — Alston & Bird LLP

(57) ABSTRACT

The present disclosure is related to articles (e.g., containers, battery packs, etc.) including a lithium material (e.g., one or more lithium-containing batteries) housed therein. The articles include sulfur hexafluoride located within an interior compartment of the article to provide an inert atmosphere within the interior compartment. The present disclosure is also related to methods of inerting such articles (e.g., containers, battery packs, etc.) with sulfur hexafluoride. Additionally, the present disclosure is related to conveyed (e.g., pumped, blown, etc.) looped cooling apparatuses and systems.

20 Claims, 7 Drawing Sheets

Related U.S. Application Data continuation of application No. 14/091,994, filed on Nov. 27, 2013, now Pat. No. 9,520,619.

(51) Int. Cl.
| | |
|---|---|
| *B65B 29/00* | (2006.01) |
| *B65D 81/20* | (2006.01) |
| *B65B 7/02* | (2006.01) |
| *B65B 7/16* | (2006.01) |
| *B65B 31/00* | (2006.01) |
| *H01M 10/0525* | (2010.01) |
| *H01M 10/052* | (2010.01) |

(52) U.S. Cl.
CPC ...... *H01M 10/052* (2013.01); *H01M 2200/10* (2013.01)

(56) References Cited

U.S. PATENT DOCUMENTS

| | | | |
|---|---|---|---|
| 7,833,646 B2 | 11/2010 | Zenger et al. | |
| 2003/0180604 A1 | 9/2003 | Zenger et al. | |
| 2005/0170238 A1* | 8/2005 | Abu-Isa | H01M 2/0242 429/82 |
| 2006/0244421 A1* | 11/2006 | Narendran | H02J 7/342 320/132 |
| 2009/0035204 A1 | 2/2009 | Xu et al. | |
| 2010/0028758 A1* | 2/2010 | Eaves | H01M 10/6569 429/50 |
| 2010/0038758 A1 | 2/2010 | Stolze | |
| 2010/0136402 A1 | 6/2010 | Hermann et al. | |
| 2010/0159343 A1 | 6/2010 | Marsh et al. | |
| 2013/0040172 A1 | 2/2013 | Chen et al. | |
| 2013/0108909 A1* | 5/2013 | Matsuo | H01M 2/1077 429/99 |
| 2013/0115489 A1* | 5/2013 | Krause | H01M 10/60 429/71 |
| 2015/0147602 A1 | 5/2015 | Bianchi et al. | |

FOREIGN PATENT DOCUMENTS

| | | | |
|---|---|---|---|
| CN | 102696130 A | 9/2012 | |
| EP | 2 077 592 A1 | 7/2009 | |
| JP | 2007-27011 | 2/2007 | |
| JP | 2007-226232 | 9/2007 | |
| JP | 2009-207650 | 9/2009 | |
| JP | 2009-238654 | 10/2009 | |
| JP | 2009-289668 | 12/2009 | |
| JP | 2010-153117 | 7/2010 | |
| WO | WO 2011/067697 A1 | 6/2011 | |
| WO | WO-2011067697 A1 * | 6/2011 | ........ H01M 10/6556 |
| WO | WO 2012/014348 A1 | 2/2012 | |

OTHER PUBLICATIONS

Office Action for Chinese Application No. 201910643793.1 dated Feb. 27, 2020, 11 pages.
European Search Report for Application No. EP 14 19 4573 dated May 28, 2015.
Groff et al.; Steady Metal Combustor as a Closed Thermal Energy Source; Apr. 1978; Journal of Hydronautics, 12, 63-70.
International Search Report and Written Opinion for Application No. PCT/JP2011/001411, dated May 24, 2011.
Little, T. E., Reactivity of Nitrogen, Oxygen, and Halogenated Gases with Molten Lithium Metal, Ph. D. Thesis, Pennsylvania State University, (Mar. 1973) (Univ. Microfilms, Order No. 74-7884), 112 pages.
Notice of Allowance for U.S. Appl. No. 14/091,994 dated Aug. 10, 2016.
Office Action for Canadian Application No. 2,865,636 dated Jul. 11, 2016.
Office Action for Chinese Application No. 201410697026.6 dated Apr. 20, 2018.
EPO Communication regarding Oral Proceedings for European Application No. 14194573.3 dated Aug. 30, 2018.
Office Action for European Application No. 14194573.3 dated Jun. 5, 2018, 7 pages.
Office Action for U.S. Appl. No. 14/091,994 dated Feb. 3, 2016.
Office Action for U.S. Appl. No. 14/091,994 dated May 31, 2016.
Office Action for U.S. Appl. No. 14/091,994 dated Sep. 17, 2015.
Office Action for U.S. Appl. No. 15/338,936 dated Aug. 2, 2018.
Office Action for U.S. Appl. No. 15/338,936 dated Oct. 25, 2018.
Office Action from corresponding European Patent Application No. 14194573.3 dated Dec. 21, 2016, 6 pages.
Office Action from corresponding European Patent Application No. 14194573.3 dated Sep. 20, 2017, 8 pages.
Rhein, R. A., Lithium Combustion: A Review, Navel Weapons Center, China Lake, CA, NWC TP 7087 (Dec. 1990) pp. 3-60.
Sulphur Hexafluoride, Sovay Fluor und Derivate GmbH (Dec. 1999) 50 page brochure.
Thurber, M., Battery fires: keeping the Li-ion caged [online] [retrieved Aug. 29, 2014]. Retrieved from the Internet: <URL: http://www.ainonline.com/aviation-news/aviation-international-news/ . . . >. (dated Feb. 2012) 5 pages.
Tillack, M. S. et al., Modeling of Lithium Fires, Nuclear Technology/Fusion, vol. 2 (Apr. 1992), pp. 233-245.
Office Action for U.S. Appl. No. 15/338,936 dated Nov. 30, 2018.
Office Action for Chinese Application No. 201410697026.6 dated Oct. 19, 2018.
Office Action for European Application No. 14194573.3 dated Aug. 30, 2018, 7 pages.
Office Action for Chinese Application No. 201410697026.6 dated Apr. 10, 2019.
U.S. Appl. No. 14/091,994, filed Nov. 27, 2013, now U.S. Pat. No. 9,520,619, Issued.
U.S. Appl. No. 15/338,936, filed Oct. 31, 2016, US-2017/0047564, Allowed.

* cited by examiner

METHODS OF INERTING LITHIUM-CONTAINING BATTERIES AND ASSOCIATED CONTAINERS

CROSS REFERENCE TO RELATED APPLICATIONS

This application is a divisional of U.S. application Ser. No. 15/338,936, filed Oct. 31, 2016, which is a continuation of U.S. application Ser. No. 14/091,994, filed Nov. 27, 2013, the entire contents of both are incorporated herein by reference.

FIELD OF THE DISCLOSURE

The present disclosure is generally related to lithium-containing batteries and containers housing lithium ion batteries that have been inerted with sulfur hexafluoride ($SF_6$) alone or in a mixture with other inert gases. The present disclosure is also related to methods of inerting lithium-containing batteries and containers housing lithium-containing batteries with $SF_6$ alone or in a mixture with other inert gases.

BACKGROUND OF THE DISCLOSURE

A lithium ion battery is a member of a family of rechargeable battery types in which lithium ions move from the anode to the cathode during discharge and back when charging. Lithium-ion batteries are common in many consumer electronics as they are one of the most popular types of rechargeable batteries for portable electronics.

The growing popularity of incorporating lithium ion batteries into an increasing range of products is likely based, at least in part, on the fact that lithium ion batteries have one of the best energy densities, no (or minimal) memory effect, and only a slow loss of charge when not in use. By utilizing lithium, which has a small specific gravity and high electrochemical reactivity, lithium ion batteries can store two to three times the energy of other rechargeable batteries such as Ni—Cd or Ni-MH batteries. In addition to consumer products, lithium ion batteries are also growing in popularity in the automotive industry and aerospace applications as the relatively light weight lithium ion batteries can provide the same or similar voltage as traditional lead-acid batteries without the "extra" weight associated with lead-acid batteries.

Despite the positive attributes of lithium ion batteries, there have been concerns associated with their use. The undesirable heating and fire caused by lithium-ion batteries has been referred to as "thermal runaway". In such cases, for example, a compromised separator in an individual cell can result in an internal short causing severe internal heating of the cell until the compromised cell vents hot gas and internal (flammable) cell materials. Unfortunately, the severe heating and/or venting of materials from a compromised cell can often times provide enough heat to an adjoining cell to cause the adjoining cell to also begin venting hot gas and internal (flammable) cell materials.

Some causes for thermal runaway include internal short circuits (as referenced earlier), overcharging of the batteries, or the combination of both. Overcharging leads to the heating of the cathode side of the cell. In charging a lithium ion battery, lithium ions are pulled out of the cathode material and inserted into the anode material. However, in this process, the cathode material from which lithium ions are extracted from becomes unstable in terms of crystal structure. In usual circumstances, lithium ion batteries are controlled so that the amounts of lithium ions extracted from the cathode do not go beyond a certain level. In cases of overcharging, however, an excessive level of lithium ions is pulled out of the cathode material and leads to the collapse of the crystal structure of the cathode material resulting in the development of an exothermic reaction. The heat generated from such a reaction can initiate the successive venting of adjoining cells (e.g., a thermal runaway).

Current approaches for addressing thermal runaway generally rely on the use of gel packs including phase change materials. Such approaches rely on inserting the gel packs at physical interfaces between groups of one or more lithium-containing battery cells. For example, the gel packs containing the phase change material can be wrapped around each battery cell to absorb heat generated from a failed battery cell. Generally, the gel packs utilize a hydrated hydrogel as the phase change material in which the water stored in the hydrogel undergoes vaporization upon overheating of a battery cell. That is, the water in the hydrogel vaporizes to enable absorption of a large quantity of heat from the overheating cell to mitigate the possibility of a thermal runaway of a lithium-containing battery. The use of phase change materials in gel packs, however, suffers from many shortcomings. For example, failure of one battery cell nonetheless releases lithium-containing electrolyte gas from the cell exposing lithium metal to moisture in the surrounding air, which generates flammable hydrogen gas. Additionally, thermal runaway may still occur if a gel pack covers an insufficient surface area of a cell. That is, gel packs are only able to provide partial direct surface coverage of the individual cells which can severely limit such a system's ability to resolve temperature spikes in a battery cell. The surface area coverage shortcomings associated with the use of gel packs limits the effectiveness of such an approach to addressing thermal runaway.

For at least these reasons, there remains a need for methods of preventing and/or suppressing thermal runaway in lithium-containing batteries and containers housing lithium-containing batteries.

BRIEF SUMMARY

In one aspect, the present disclosure provides a method for inerting a lithium ion battery and/or suppressing thermal runaway in a lithium-containing device. Certain implementations of the disclosure include contacting an electrolyte release from a lithium-containing device with an inert gas (or mixture of inert gases) and dissipating an ambient temperature of the electrolyte release. In additional aspects, the present disclosure provides methods of suppressing thermal runaway in a lithium-containing battery comprising steps of adding sulfur hexafluoride into an interior compartment of a casing enclosing a lithium-containing battery through at least one orifice in the casing and displacing oxygen from the interior compartment. For example, a lithium-containing battery can be positioned or located within an outer casing (e.g. a metal enclosure). The outer casing can define an interior compartment in which one or more hermetically sealed lithium-containing battery cells are housed. The outer casing can preferably also include at least one orifice (e.g., valve or capable port). Preferably, the orifice can be opened and closed as desired to enable addition or withdrawal of materials (e.g., gases) into or out of the interior compartment. In certain aspects, for instance, a step of adding an inerting gas (e.g., sulfur hexafluoride) into the interior compartment (which preferably already contains the lithium ion batteries to be inerted) through the at least one orifice. In certain aspects, the lithium-containing battery comprises a single lithium ion battery cell, a battery pack comprising a plurality of individual lithium ion battery cells housed inside of the battery pack, or a combination thereof. In certain aspects, the outer casing can comprise a battery pack casing enclosing one or more individual lithium-containing batteries therein. In this regard, individual battery packs can be inerted and used in a vast variety of applications suitable for lithium-containing batteries (e.g., aircraft, automobiles, electronic consumer goods, powered medical devices, etc.).

In another aspect, the present disclosure provides a method of inerting a container (e.g., a shipping container or a storage container) including a lithium material. In accordance with such aspects, methods of inerting a container can comprise positioning at least one lithium material (e.g., lithium-containing battery) inside of a sealable container and adding sulfur hexafluoride into an interior compartment of said sealable container such that the lithium material is either directly or indirectly surrounded by sulfur hexafluoride ($SF_6$). In certain implementations, the lithium material contained within the sealable container comprises one or more lithium ion batteries (e.g., single cell(s) or battery pack(s)). The sealable container, preferably, includes at least one orifice (e.g., valve) through which air from within the interior compartment can be evacuated and/or for addition of $SF_6$ into the interior compartment.

In certain aspects, the present disclosure also provides methods for suppressing thermal runaway in a lithium-containing device comprising a step of reacting a lithium-containing electrolyte gas release from the lithium-containing device with sulfur hexafluoride and producing non-volatile lithium sulfide and lithium fluoride solids.

In yet another aspect, the present disclosure provides an inerted article. Articles according to certain aspects of the present disclosure can include an external sealable casing or outer casing, a lithium material (e.g., lithium-containing battery) housed within the external sealable casing, and $SF_6$ located within said external sealable casing. Preferably, the lithium material comprises one or more lithium ion batteries (e.g., one or more individual lithium ion battery cells, one or more lithium ion battery packs, etc.). In certain aspects, the article comprises a shipping container, a storage container, an individual encased battery cell, or a battery pack. For instance, certain articles according to aspects of the present disclosure comprise one or more closed lithium-containing batteries (e.g., lithium ion battery cells) that are further sealed inside a container (e.g., storage/shipping container or battery pack housing) filled with $SF_6$.

In an additional aspect, the present disclosure provides conveyed (e.g., pumped, blown, etc.) looped cooling apparatuses and systems. In certain aspects, the apparatus and/or system generally includes an article as described herein operatively connected to a heat exchanger (e.g., a radiator) and preferably a gas conveying device (e.g., pump, blower, etc.). For instance, the article can comprise one or more lithium-containing batteries (e.g., lithium ion batteries) housed or located with an external casing (e.g., a battery pack housing/casing, shipping container, storage container, etc.). The external casing can comprise at least an inlet orifice and an outlet orifice. The external casing can generally define an interior compartment of the article and the one or more lithium ion batteries can be positioned therein. Furthermore, the external casing and the one or more lithium-containing batteries (e.g., lithium ion batteries) define a free space therebetween. This free space is preferably filled with an inert gas (e.g., $SF_6$). The heat exchanger comprises at least one heat exchanger inlet in fluid communication with the outlet orifice of the external casing of the article and at least one heat exchanger outlet in fluid communication with the inlet orifice of the external casing. Preferably, the apparatus and/or system also includes a gas conveying device in fluid communication with both the heat exchanger and the article. In this regard, the apparatus and/or system can include an inert gas (e.g., $SF_6$) that is contained or sealed (preferably under positive pressure) therein. As such, the apparatus and/or system can be filled with an inert gas (e.g., $SF_6$) and the free space defined by the external casing and the one or more lithium-containing batteries (e.g., lithium ion batteries) is filled with the inert gas (e.g., $SF_6$). Such aspects, therefore, provide $SF_6$ (for example) in direct contact with the outside of the one or more lithium-containing batteries (e.g., individual lithium ion battery cells or lithium ion battery packs).

In yet another aspect, the present disclosure provides articles for containing and extinguishing a fire. In certain implementations, the articles can comprise a sealable container (e.g., rigid box structure, flexible bag structure, etc.) in which sulfur hexafluoride gas is located. The sealable containers can be open and closed as desired. Preferably, the opening for the articles is positioned such that $SF_6$ does not escape from the sealable container then the container is open to the surrounding atmosphere. Articles according the certain aspects can be configured to accommodate or house a variety of commonly used portable consumer products (e.g., phones, laptops, tools, etc.). In the event that a consumer device or product experiences a thermal runaway (e.g., lithium-containing battery undergoes thermal runaway), the consumer device or product can be placed inside of the $SF_6$-containing article to suppress the thermal runaway and/or extinguish the fire. Accordingly, such articles can be structurally incorporated into a variety of vehicles including, for example, automobiles, aircraft, spacecraft, and watercraft. In certain other implementations, however, the article can be carried by an individual.

BRIEF DESCRIPTION OF THE SEVERAL VIEWS OF THE DRAWINGS

Figure 1:
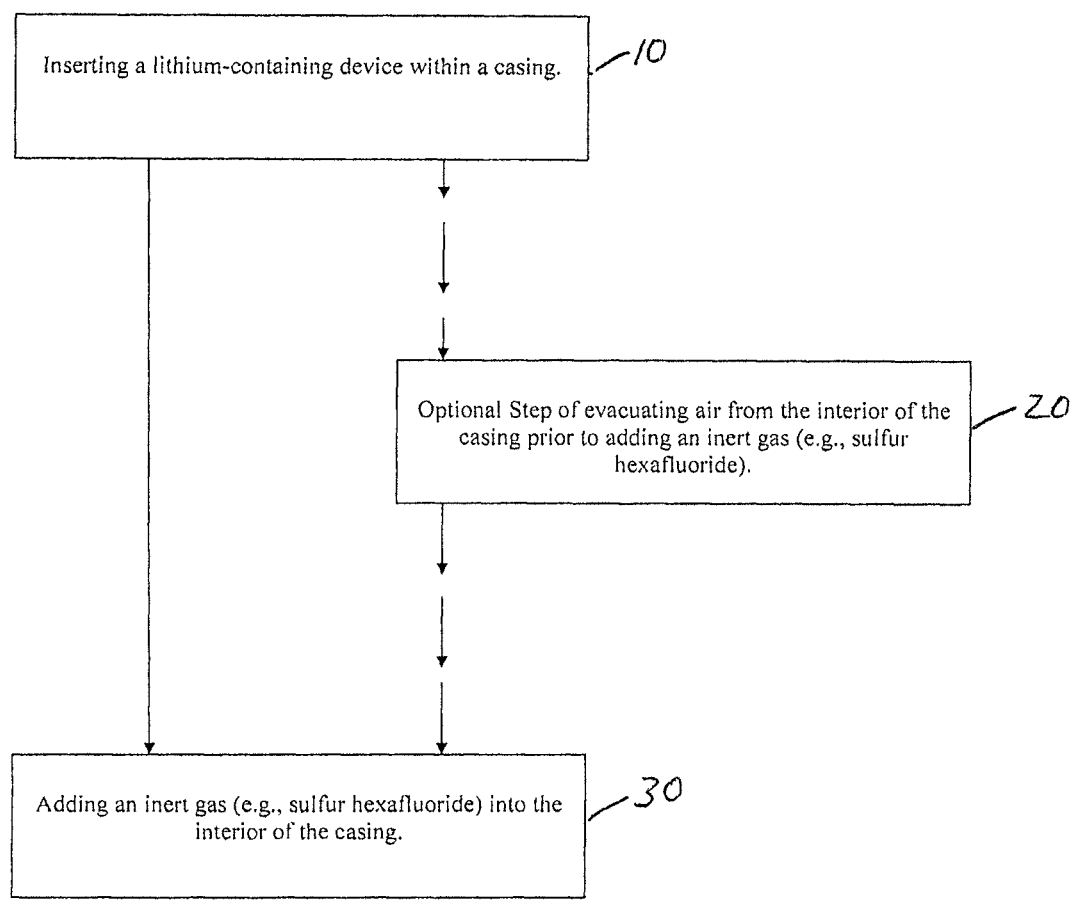
Figure 2:
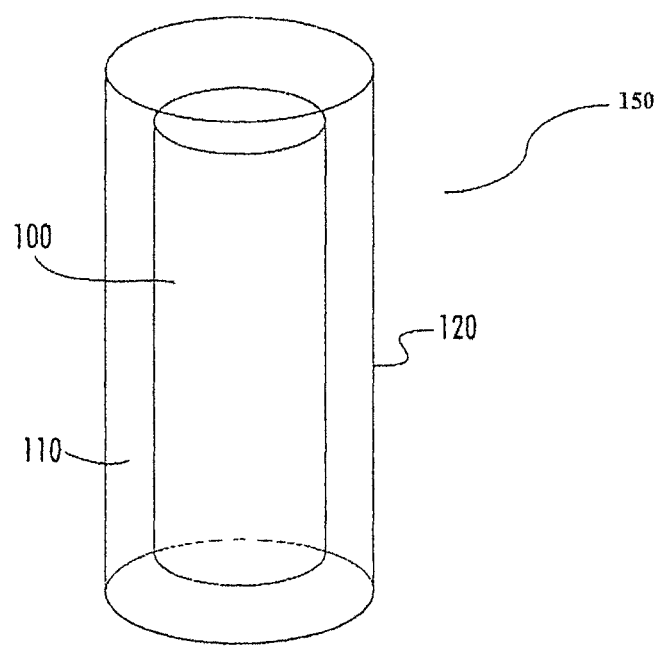
Figure 3:
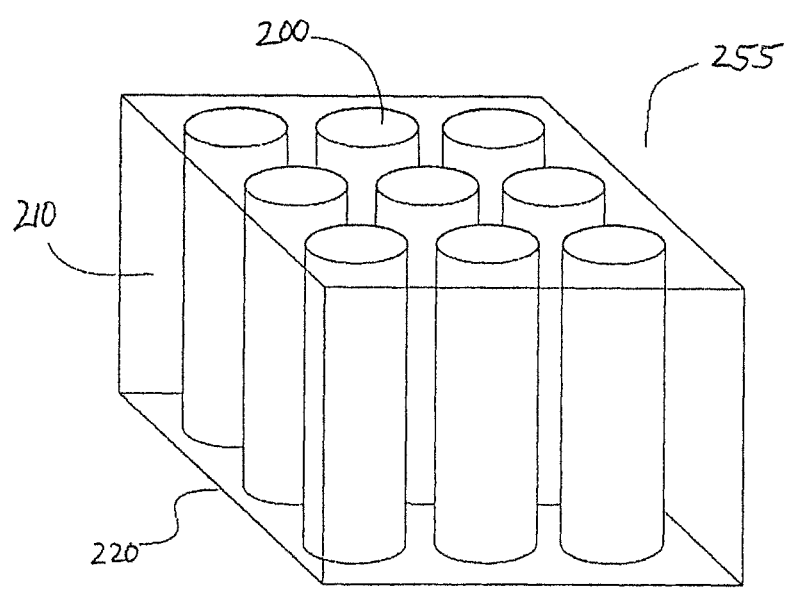
Figure 4:
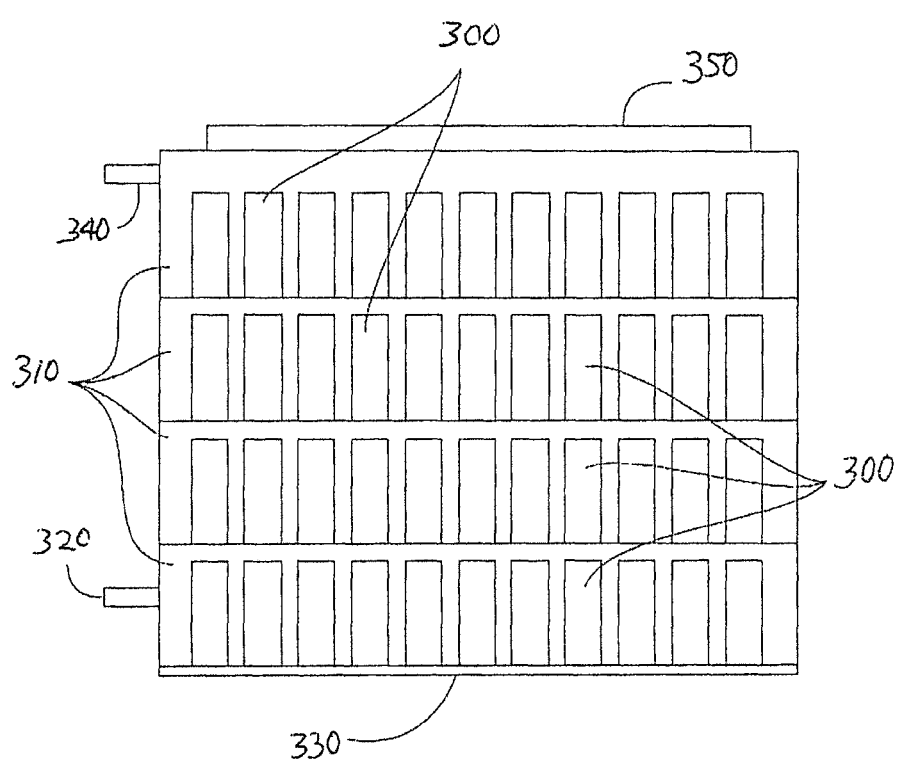
Figure 5:
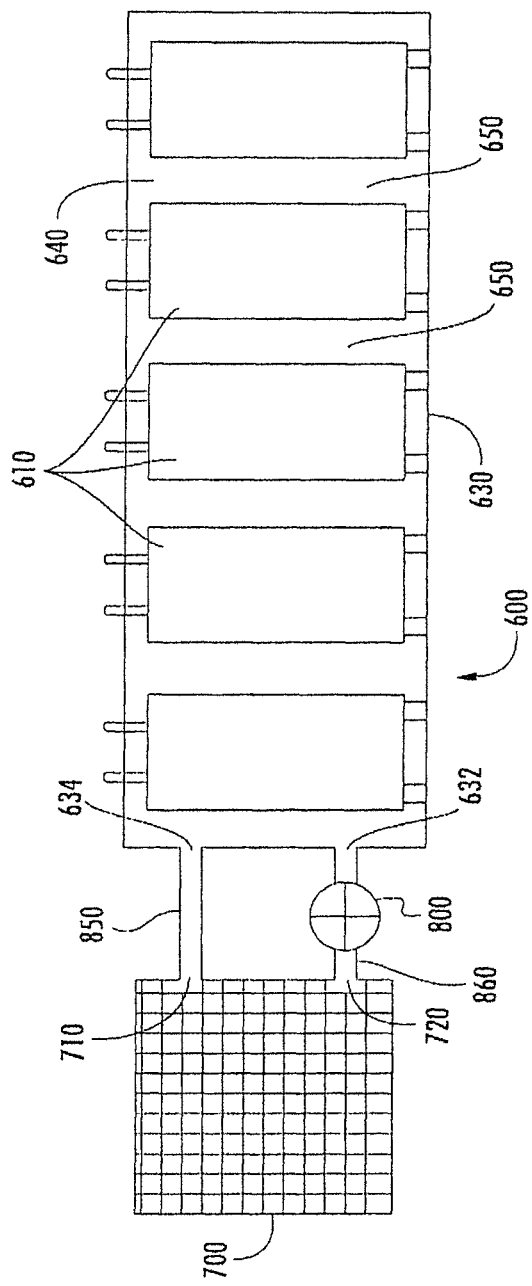
Figure 6:
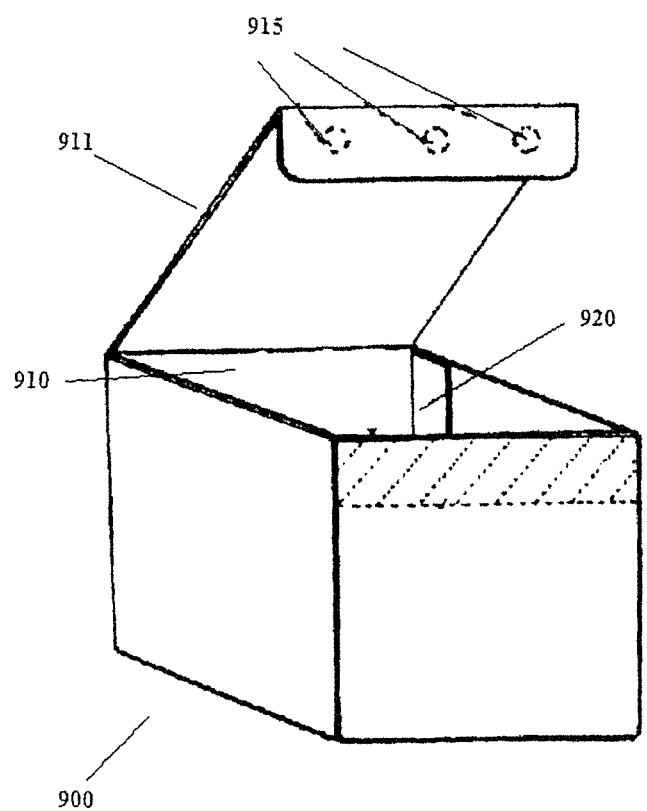
Figure 7:
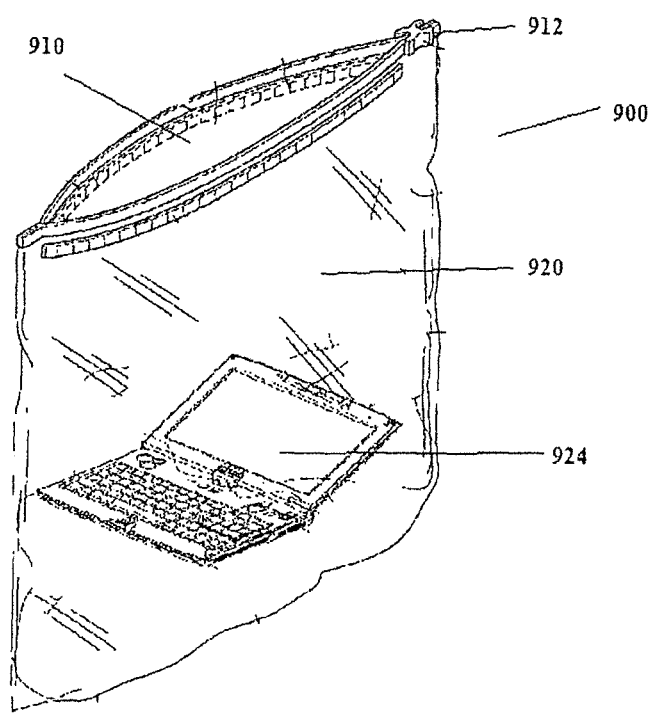

Having thus described the disclosure in general terms, reference will now be made to the accompanying drawings, which are not necessarily drawn to scale, and wherein:

FIG. 1 is a flow chart illustrating certain aspects including an optional step of evacuating an inner compartment prior to adding sulfur hexafluoride according to the present disclosure;

FIG. 2 illustrates a battery comprising a single lithium ion battery cell inerted by sulfur hexafluoride;

FIG. 3 illustrates a battery pack comprising a plurality of individual lithium ion battery cells housed inside of the battery pack;

FIG. 4 illustrates a container (e.g., shipping or storage container) housing a plurality of lithium ion batteries therein;

FIG. 5 illustrates an apparatus according to certain aspects of the present disclosure;

FIG. 6 illustrates an article including a sealable container according to certain aspects of the present disclosure; and FIG. 7 illustrates an article including a sealable container comprising a bag according to certain aspects of the present disclosure.

DETAILED DESCRIPTION

The present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout. As used in the specification, and in the appended claims, the singular forms "a", "an", "the", include plural referents unless the context clearly dictates otherwise.

In one aspect, the present disclosure provides methods of inerting and/or suppressing thermal runaway in lithium-containing batteries and containers housing lithium materials (e.g., lithium-containing batteries, lithium ion batteries, lithium ion polymer batteries, etc.) by utilizing an inerting gas, such as $SF_6$. As used herein, the term "lithium-containing battery" can include any battery that includes any form of lithium therein, including but not necessarily limited to lithium ion batteries, lithium polymer batteries, and the like.

In certain aspects, the inerting gas consists only of $SF_6$ (i.e., 100% $SF_6$), while in other aspects $SF_6$ can be mixed to varying degrees with other inerting gases (e.g., nitrogen or argon) such that the inerting gas comprises $SF_6$. For instance, a mixture of inert gases can include from about 1% to about 99% $SF_6$ with the remainder being another inert gas or gases; from about 30% to about 90% $SF_6$ with the remainder being another inert gas or gases; or from about 45% to about 80% $SF_6$ with the remainder being another inert gas or gases. Methods according to aspects of the present disclosure use an inert gas (e.g., $SF_6$) or mixtures of inert gases to provide an inert environment by excluding air (which includes oxygen) and replacing it with a non-flammable gas such as $SF_6$. Preferably, the non-flammable gas comprises or consists of $SF_6$. Use of $SF_6$ is particularly desirable for certain methods according to the present disclosure since $SF_6$ is a non-flammable gas, a non-toxic gas, an electronegative gas that has the ability to suppress electrical arcing, an electrically insulating gas with a high dielectric constant, a heavy gas resulting in a very high thermal capacity and heat transfer ability, and a lower leak rate than any other inerting gas (e.g., nitrogen), and a gas having a particularly low adiabatic coefficient resulting in a particularly lower thermal expansion under heating than other inerting gases. Moreover, $SF_6$ also exhibits excellent thermal stability at high temperatures.

Additional benefits of methods according to certain aspects of the present disclosure comprising the use of $SF_6$ as an inerting medium include the ability to use a material in its gaseous phase. For instance, the use of an inerting medium in a gas phase does not face surface area limitations. That is, the use of an inerting gas (e.g., $SF_6$) according to aspects of the present disclosure is able to effectively provide complete surface area coverage with minimal effort.

Also, the particular use of $SF_6$ in inerting lithium-containing batteries (e.g., lithium ion batteries) and container housing lithium-containing batteries (e.g., lithium ion batteries) provides a benefit not realized by using other inerting gases. That is, $SF_6$ can desirably react with lithium-containing electrolyte gas to produce non-volatile lithium sulfide $Li_2S$ (solid) and lithium fluoride LiF (solid) solids which decreases the pressure of the system. For instance, the reaction of $SF_6$ with lithium beneficially does not yield gaseous products, but instead forms innocuous solid products $Li_2S$ (solid) and lithium fluoride LiF (solid). The formation of solids instead of additional gaseous products helps prevent additional pressure build-up within the system (e.g., external casing, battery pack casing, etc.) that could eventually cause a rupture into the external environment. Moreover, the formation of innocuous solids prevents reaction with moisture containing air that could produce ignitable hydrogen gas. The reaction of lithium-containing electrolyte gas released from a lithium-containing device (e.g., lithium-containing battery) with sulfur hexafluoride to form lithium sulfide and lithium fluoride solids that prevent reaction of lithium present in the lithium-containing electrolyte with moisture containing air can be represented by the following equation:

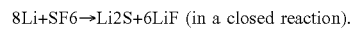

8Li+SF6→Li2S+6LiF (in a closed reaction).

With regards to inerting lithium-containing batteries (e.g., lithium ion batteries) with $SF_6$, the lithium utilized in battery applications remains in a solid phase, not liquid, so that any discharge of lithium material due to venting or rupture of a lithium ion battery cell would comprise a relatively slow release of lithium (not all at once). If a cell were to rupture, any free lithium metal released slowly reacts with $SF_6$ to form innocuous solid products $Li_2S$ (solid) and lithium fluoride LiF (solid). In addition to free lithium metal being released upon rupture of the hermetically sealed cell casing, the compromised cell will also release volatile and flammable gases of the organic electrolyte (e.g., ethylene). The release of this organic electrolyte can traditionally lead to fire or combustion as these materials have flash points and auto-ignition temperatures that lend to susceptibility of combustion and fire. Table 1 provides a summary of some typical lithium ion cell organic electrolytes.

TABLE 1

Measured flash points, auto-ignition temperatures, and heats of combustion of some typical lithium-ion cell organic electrolyte components

| Electrolyte Component | CAS Registry Number | Molecular Formula | Melting Point | Boiling Point | Vapor Pressure (torr) | Flash Point | Auto Ignition Temperature | Heat of Combustion |
|---|---|---|---|---|---|---|---|---|
| Propylene Carbonate | 108-32-7 | $C_4H_6O_3$ | 49 C. | 242 C. | 0.13 @ 20 C. | 135 C. | 455 C. | −20.1 KJ/ml |
| Ethylene Carbonate | 96-49-1 | $C_3H_4O_3$ | 36 C. | 248 C. | 0.02 @ 36 C. | 145 C. | 465 C. | −17.2 kJ/ml |
| Di-Methyl Carbonate | 616-38-6 | $C_3H_6O_3$ | 2 C. | 91 C. | 18 @ 21 C. | 18 C. | 458 C. | −15.9 kJ/ml |
| Diethyl Carbonate | 105-58-8 | $C_5H_{10}O_3$ | −43 C. | 125 C. | 10 @ 24 C. | 25 C. | 445 C. | −20.9 kJ/ml |
| Ethyl Methyl Carbonate | 623-53-0 | $C_4H_8O_3$ | −14 C. | 107 C. | 27 @ 25 C. | 25° C. | 440 C. | Not Available |

Certain aspects of the present disclosure, however, suppress this initial combustion process which prevents the high heat associated with the combustion process. By suppressing this initial combustion process, therefore, any discharged lithium is prevented from reaching its combustion temperature. Accordingly, a thermal runaway can be prevented.

In certain aspects, therefore, the present disclosure provides methods of suppressing thermal runaway in a lithium-containing device (e.g., device including one or more lithium-containing batteries) comprising reacting a lithium-containing electrolyte gas release from the lithium-containing device with sulfur hexafluoride and producing non-volatile lithium sulfide and lithium fluoride solids as described above.

In this regard, the present disclosure also provides methods of suppressing a thermal runaway in lithium-containing batteries (e.g., lithium ion batteries) by using $SF_6$. For instance, certain aspects of the present disclose prevent thermal runaway between overheated or ruptured cell(s) in a lithium ion battery by, at least, dissipating the heat from the overheated or ruptured cell(s) by using $SF_6$ gas surrounding the individual lithium ion battery or battery cell(s). That is, $SF_6$ gas can be positioned outside an individual lithium battery cell's casing and within an external casing housing both the $SF_6$ and the lithium ion battery cell(s). In this regard, $SF_6$ is in essence "sandwiched" or "fills" a volume of space defined by the casing(s) of the individual lithium ion batteries (e.g., cells or battery packs) and the external casing housing both the $SF_6$ and the lithium ion batteries (e.g., cells or battery packs).

In accordance with certain aspects of the present disclosure, the inerting gas comprises or consists of $SF_6$. $SF_6$ is an inorganic, colorless, non-toxic, non-flammable, and odorless gas having a density of about 6.12 g/L, making $SF_6$ about 6 times heavier than air (1.225 g/L). $SF_6$ is one of the heaviest known gases.

$SF_6$ is an excellent electrical insulator. The electrical insulating properties of $SF_6$ are generally attributed to the strong electron affinity (electronegativity) of the molecule. For instance, $SF_6$ has a dielectric constant of 1.0021 at 20° C., 1.0133 bar and 23.340 Mhz; a rise in pressure to 20 bar leads to an increase of about 6% in this value.

In addition to acting as an excellent electrical insulator, $SF_6$ also demonstrates a desirable thermal capacity for dispensing heat from an overheated or ruptured lithium ion battery cell. For instance, $SF_6$ has a thermal mass (at 1.013 bar and 21° C.) of more than 4.0 $kJ/K/m^3$, which is roughly a factor of 4 greater than nitrogen. As a result, the temperature increase in $SF_6$ is only 25% of that in nitrogen for the same energy absorption, per unit volume.

As referenced briefly above, $SF_6$ also has a particularly low adiabatic coefficient. Due to its low adiabatic coefficient, the pressure rise as a result of thermal expansion following dielectric breakdown (e.g., the $SF_6$ absorbs enough heat to start increasing in temperature itself) is less than that with other inerting gases and strikingly less than liquid dielectrics. This beneficial property of $SF_6$ helps mitigate the risk of the external casing or sealable container (according to certain aspects of the present disclosure) from rupturing due to an increased internal pressure associated from both the increased heat and expansion of the inerting medium.

An additional advantage to using $SF_6$ in accordance with certain aspects of the present disclosure is the notable arc-quenching capacity of $SF_6$ due to its thermal properties and low ionization temperature. That is, $SF_6$ exhibits outstanding characteristics for the extinguishing of electric arcs. For instance, the arc-quenching time using $SF_6$ is about 100 times less than that using air given equal conditions. In order to quench arcs, the fluid must capture electrons, absorb electron energy, and lower the arc temperature. The very high cross sectional area of the $SF_6$ molecule and the high electron affinity of the fluorine atoms are believed to be the basic reason that $SF_6$ is such an effective arc quenching gas.

Accordingly, one aspect of the present disclosure provides methods for inerting one or more lithium-containing batteries (e.g., single cell(s) or battery packs) and/or suppressing thermal runaway in a lithium-containing device. The outer casing can define an interior compartment in which one or more hermetically sealed lithium-containing battery cells are housed. The outer casing can preferably also include at least one orifice (e.g., valve or capable port). Preferably, the orifice can be opened and closed as desired to enable addition or withdrawal of materials (e.g., gases) into or out of the interior compartment. In certain aspects, for instance, a step of adding an inerting gas (e.g., sulfur hexafluoride) into the interior compartment (which preferably already contains the lithium ion batteries to be inerted) through the at least one orifice. In certain aspects, the lithium-containing battery comprises a single lithium ion battery cell, a battery pack comprising a plurality of individual lithium ion battery cells housed inside of the battery pack, or a combination thereof. In certain aspects, the outer casing can comprise a battery pack casing enclosing one or more individual lithium-containing batteries therein. In this regard, individual battery packs can be inerted and used in a vast variety of applications suitable for lithium-containing batteries (e.g., aircraft, automobiles, electronic consumer goods, powered medical devices, etc.).

In accordance with certain preferred aspects, the interior compartment defined by the outer or external casing can be evacuated before or after (preferably after) addition of the lithium ion battery or batteries and prior to adding the inerting gas (e.g., $SF_6$). For instance, in certain aspects the methods of inerting a lithium ion battery comprise a step of evacuating the interior compartment prior to addition of the inerting gas. The step of evacuating the interior compartment can be performed by use of a vacuum pump or the like, in which air contained in the interior compartment is withdrawn leaving the interior compartment under a slight vacuum. After evacuation, the inerting gas (e.g. $SF_6$) can be filled into the interior compartment. As such, the inerting gas (e.g., $SF_6$) is in essence "sandwiched" or "fills" a volume of space defined by the casing(s) of the individual lithium ion batteries (e.g., cells or battery packs) and the external casing housing both the SF6 and the lithium ion batteries (e.g., cells or battery packs).

Although the evacuation (if performed) and the addition of the $SF_6$ can be performed through the same orifice, preferred aspects utilize a first orifice (e.g., an outlet valve connected to the outer/external casing) for removal of air from the internal compartment and a second orifice (e.g., an inlet valve connected to the outer/external casing) for the addition of $SF_6$. In accordance with certain aspects, for example, the air inside the interior compartment can be first evacuated via a vacuum pump through the outlet orifice. Preferably, the outlet orifice is closed or sealed after the interior compartment has been evacuated and prior to filling of the interior compartment with $SF_6$ through the inlet orifice. After sufficient addition of $SF_6$, the inlet orifice is also sealed or closed.

Preferably, the outlet orifice is positioned on a top portion of the outer casing and the inlet orifice is positioned on a bottom portion of the outer casing. When the outer casing has such a configuration, the addition of the $SF_6$ through the inlet orifice located at a bottom portion of the outer casing can effectively displace the air (including oxygen) out of the interior compartment and out the outlet orifice located at a top portion of the outer casing.

In accordance with certain aspects of the present disclosure, the outer casing also comprises one or more electrical leads positioned to form an electrical connection with said lithium ion battery or batteries encased therein to provide power to an external load. Formation of appropriate electrical connections is routine to one of skill in the art. In this regard, the encased and inerted lithium ion batteries can be utilized as a viable power source while remaining encased in an inerted atmosphere. Cells can be mounted, preferably rigidly mounted, to the $SF_6$ filled outer container to prevent movement of the cells. In certain aspects, for example, the mounting of the cells can be accomplished by means of the sealed pass through electrical terminals of the cell.

FIG. 1 provides a flow chart illustrating certain aspects according to the present disclosure. One aspect illustrated by FIG. 1 includes an initial step 10 comprising inserting a lithium-containing device (e.g., lithium-containing batteries) within an outer casing followed by an inert gas (e.g., $SF_6$) addition step 30. In the inert gas (e.g., $SF_6$) addition step 30, inert gas (e.g., $SF_6$) is added into the interior compartment defined by the outer casing through at least one orifice. As illustrated by the dashed lines, certain implementations of the present disclosure can include an optional evacuation step 20 prior to the inert gas (e.g., $SF_6$) addition step 30. Optional evacuation step 20 can comprise evacuating air from the interior of the casing prior to adding an inert gas (e.g., $SF_6$).

In another aspect, the present disclose provides an inerted article (e.g., lithium ion battery or battery pack). Articles according to certain aspects of the present disclosure can include an outer or external sealable casing (e.g., a metal casing), a lithium material (e.g., lithium ion battery or battery pack) housed within the external sealable casing, and sulfur hexafluoride located within said external sealable casing. In this regard, a sealed lithium ion battery can be further enclosed by an outer casing and the inerting gas (e.g., $SF_6$) is in essence "sandwiched" or "fills" a volume of space defined by the casing of the individual lithium ion batteries (e.g., individual cell or battery pack) and the external/outer casing housing both the $SF_6$ and the lithium ion batteries (e.g., individual cell or battery pack). In the case of lithium ion battery packs housing a plurality of individual lithium ion battery cells, the outer casing can comprise that existing battery pack enclosure or an additional enclosure can be provided around the existing battery pack housing. That is, the battery pack housing itself can comprise the outer casing in which case an "extra" casing around the entirety of the battery pack is not required (but could be added if desired). Preferably, $SF_6$ is provided in direct contact with the outside of the individual lithium ion battery cells.

In certain aspects, a sealed lithium ion battery pack can housed within the outer casing while in other aspects the outer casing can comprise a sealed battery pack enclosure itself. In aspects in which the outer casing comprises a battery pack enclosure, a plurality of individual lithium ion battery cells can be housed inside of the battery pack enclosure. In certain preferred aspects, a battery pack can be housed within an outer casing (other than the individual battery pack enclosure) and an inerting gas (e.g., $SF_6$) is filled/added into a battery pack interior defined by the battery pack's enclosure. In addition to individual battery packs being filled (e.g., inerted) with an inerting gas (e.g., $SF_6$), an inerting gas (e.g., $SF_6$) can also added (or located) into the interior compartment defined by an outer/external casing in which the battery pack can optionally be housed within. Such aspects, provide a redundancy of $SF_6$ protection (e.g., $SF_6$ inside the individual battery pack and also between the exterior of the battery pack and an outer casing)

In accordance with certain aspects of the present disclosure, the outer casing also comprises one or more electrical leads positioned to form an electrical connection with said lithium ion battery or batteries encased therein to provide power to an external load. Formation of appropriate electrical connections is routine to one of skill in the art. For instance, battery packs are routinely configured to form electrical connection between the individual lithium ion battery cells housed therein with external devices. In this regard, the encased and inerted lithium ion batteries can be utilized as a viable power source while remaining encased in an inerted atmosphere.

FIG. 2 illustrates an article according to one aspect of the present disclosure. In the illustrated aspect, the article 150 comprises a lithium ion battery encased within an outer casing. In particular, the article 150 includes a lithium ion battery comprising a single lithium ion battery cell 100 encased within an outer casing 120, in which $SF_6$ gas 110 is utilized as an inerting gas. That is, the $SF_6$ gas 110 is enclosed within the outer casing 120 and in direct contact with the outside surfaces of the single lithium ion battery cell 100.

FIG. 3 illustrates an article according to another aspect of the present disclosure, in which the article 255 comprises a lithium ion battery pack. As shown in FIG. 3, the article includes a plurality of individual lithium ion battery cells 200 encased within an outer casing 220. In this particular aspect, the outer casing 220 comprises a battery pack casing. That is, the casing defining the battery pack housing acts as the outer casing. As also shown in FIG. 3, $SF_6$ gas 210 is enclosed within the outer casing 220 and in direct contact with the outside surfaces of the individual lithium ion battery cells 200. Although not illustrated in FIG. 3, the individual lithium ion battery cells 200 are preferably electrically connected to each other as is customary to provide a desired voltage.

In another aspect, the present disclosure provides a method of inerting a container (e.g., a shipping container or a storage container) including a lithium material. In accordance with such aspects, methods of inerting a container can comprise positioning at least one lithium material (e.g., lithium-containing battery) inside of a sealable container and adding sulfur hexafluoride into an interior compartment of said sealable container such that the lithium material is either directly or indirectly surrounded by sulfur hexafluoride ($SF_6$). In certain implementations, the lithium material contained within the sealable container comprises one or more lithium ion batteries (e.g., single cell(s) or battery pack(s)). The sealable container, preferably, includes at least one orifice (e.g., valve) through which air from within the interior compartment can be evacuated and/or for addition of $SF_6$ into the interior compartment.

In certain aspects, the at least one orifice can be opened and closed as desired to enable addition or withdrawal of materials (e.g., gases) into or out of the interior compartment of the container. In certain aspects, for instance, a step of adding an inerting gas (e.g., $SF_6$) into the interior compartment (which preferably already contains lithium ion batteries) through the at least one orifice. In certain aspects, the lithium ion battery or batteries can comprises single lithium ion battery cells, battery packs comprising a plurality of individual lithium ion battery cells housed therein, or a combination thereof.

In accordance with certain preferred aspects, the interior compartment defined by the sealable container enclosing the lithium material can be evacuated before or after (preferably after) addition of the lithium material (e.g., lithium ion battery or batteries) and prior to adding the inerting gas (e.g., $SF_6$). For instance, in certain aspects the methods of inerting a container including a lithium ion battery comprise a step of evacuating the interior compartment prior to addition of the inerting gas (e.g., $SF_6$). The step of evacuating the interior compartment can be performed by use of a vacuum pump or the like, in which air contained in the interior compartment is withdrawn and leaving the interior compartment of the sealable container under a slight vacuum. After evacuation, the inerting gas (e.g. $SF_6$) can be filled into the interior compartment. As such, the inerting gas (e.g., $SF_6$) is in essence "sandwiched" or "fills" a volume of space defined by the casing(s) of the individual lithium ion batteries (e.g., cells or battery packs) and the external casing housing both the $SF_6$ and the lithium ion batteries (e.g., cells or battery packs).

Although the evacuation (if performed) and the addition of the $SF_6$ can be performed through the same orifice, preferred aspects utilize a first orifice (e.g., an outlet valve connected to the sealable container) for removal of air from the internal compartment and a second orifice (e.g., an inlet valve connected to the sealable container) for the addition of $SF_6$. In accordance with certain aspects, for example, the air inside the interior compartment of the sealable container can be first evacuated via a vacuum pump through the outlet orifice. Preferably, the outlet orifice is closed or sealed after the interior compartment has been evacuated and prior to filling of the interior compartment with $SF_6$ through the inlet orifice to prevent escape of $SF_6$. After sufficient addition of $SF_6$, the inlet orifice is also sealed or closed.

Preferably, the outlet orifice is positioned on a top portion of the sealable container and the inlet orifice is positioned on a bottom portion of the sealable container. When the sealable container has such a configuration, the addition of the $SF_6$ through the inlet orifice located at a bottom portion of the sealable container can effectively displace the air (including oxygen) out of the interior compartment and out the outlet orifice located at a top portion of the external casing.

In certain aspects, the sealable container is first evacuated and then filled with $SF_6$ under pressure. In the filling or addition of $SF_6$ step, a feed line from a gas cylinder comprising $SF_6$ is connected to the sealable container via at an orifice. Preferably, the orifice and/or feed line comprises a shut-off valve. $SF_6$ can be added into the interior compartment of the sealable container via the feed line and orifice associated with the sealable container. Use of a pressure gauge during the filling step is helpful and the final pressure inside the sealable container will depend on temperature. Since the $SF_6$ can undergo a cooling process on leaving the supply cylinder, the pressure reading immediately following the completion of the filling step will be less than that shown after the $SF_6$ gas temperature has raised to ambient temperature. This subsequent rise in pressure should be considered when filing the interior compartment of the sealable container. The final pressure of the $SF_6$-filled units (e.g., containers) can vary. In certain preferred aspects, however, the final pressure of the $SF_6$-filled units (e.g., containers) comprises a pressure above ambient pressure (e.g., the atmospheric pressure, or pressure in the environment or surrounding area) to prevent air from leaking into the container. By way of example only, the final pressure of the $SF_6$-filled units (e.g., containers) can comprise a pressure slightly above ambient pressure such as a pressure range of 0.02 inches to 0.5 inches water column ($H_2O$), wherein the ambient pressure is given a reference value of zero (0) inches water column ($H_2O$).

Accordingly, the present disclosure also provides methods of shipping and/or storing $SF_6$-inerted containers enclosing lithium ion batteries therein. The use of $SF_6$-inerted containers for the shipment and/or storage of one or more lithium ion batteries at least partially satisfies a long-felt need for a safe method of storing and/or shipping a plurality of lithium ion batteries. As discussed previously, methods according to aspects of the present disclosure in which $SF_6$ is utilized as an inerting gas significantly mitigates the risk of fires and/or explosions associated with compromised lithium ion batteries. Shipping and storage containers can often times include numerous lithium ion batteries exacerbating the potential hazard if merely one of the lithium ion batteries experiences a thermal runaway as merely one compromised lithium ion battery could trigger a chain reaction in which every one of the batteries being stored or shipped catches fire. Accordingly, aspects of the present disclosure provide a much needed solution to a potentially hazardous long-felt need.

Additionally, the present disclosure also provides articles including an external sealable casing (e.g., shipping or storage container) including a lithium material (e.g., individual lithium ion battery cells and/or lithium battery packs) enclosed therein. The articles can also include an inerting gas comprising or consisting of $SF_6$ within an interior compartment defined by the external sealable casing (e.g., shipping or storage container). That is, the inerting gas (e.g., $SF_6$) is in essence "sandwiched" or "fills" a volume of space defined by the casing(s) of the individual lithium ion batteries (e.g., cells or battery packs) and the external casing (e.g., shipping or storage container) housing both the $SF_6$ and the lithium ion batteries (e.g., cells or battery packs).

FIG. 4 illustrates an article comprising a container (e.g., shipping or storage container) housing a plurality of lithium ion batteries therein. As showing in FIG. 4, the article comprises an external sealable casing 330 having an upper portion 332 and lower portion 334, in which a plurality of lithium ion batteries (e.g., individual cells and/or battery packs each housing individual cells) 300 are contained. An inerting gas 310 comprising or consisting of $SF_6$ is enclosed within the external sealable casing 330 and is in directed contact with the plurality of lithium ion batteries (e.g., individual cells and/or battery packs each housing individual cells) 300. FIG. 4 also illustrates a particular aspect including an outlet orifice (e.g., valved outlet, capable port, etc.) 340 and an inlet orifice (e.g., valved outlet, capable port, etc.). As discussed previously, the interior of the external sealable casing 330 can be evacuated by vacuum through outlet orifice 340 and sealed/closed prior to addition of the inerting gas through inlet orifice 320. FIG. 4 also illustrates and aspect including a lid 350 positioned on a top side of the external sealable casing 330. The lid 350 can be opened and closed/sealed to load and unload the article with the lithium ion batteries as desired.

In practice, it may be desirable to unload only a portion of the stored/shipped lithium ion batteries at an initial time while leaving some batteries in the container for further shipping or storage. One option for accessing and removing a select portion of the batteries from a $SF_6$ inerted container includes pumping out the $SF_6$ gas from the sealable container and into a storage vessel prior to opening the container and retrieving a portion of the batteries. In aspects in which a lid (or the like) is positioned at or near the top portion of the container, however, the lid could simply be opened without pumping out (evacuating) the $SF_6$ gas from the container since $SF_6$ gas is significantly more dense than air. That is, an appreciable amount of $SF_6$ gas would not leak out of the container during removal of a portion of the batteries due to the significant density deference between $SF_6$ and air.

In an additional aspect, the present disclosure provides conveyed (e.g., pumped, blown, etc.) looped cooling apparatuses and systems. In certain aspects, the apparatus and/or system generally includes an article as described herein operatively connected to a heat exchanger (e.g., a radiator) and preferably a gas conveying device (e.g., pump, blower, etc.). As used herein, the term "heat exchanger" can generally refer to a piece of equipment configured for heat transfer from one medium (e.g., inert gas such as $SF_6$) to another. The media can be separated by a solid wall to prevent mixing or they may be in direct contact in certain applications.

The article according to certain aspects of the present disclosure, for instance, can comprise one or more lithium ion batteries housed or located with an external casing (e.g., a battery pack housing/casing, shipping container, storage container, combinations thereof, etc.). The external casing can comprise at least an inlet orifice and an outlet orifice. The external casing can generally define an interior compartment of the article and the one or more lithium ion batteries can be positioned therein. Furthermore, the external casing and the one or more lithium ion batteries define a free space therebetween. This free space is preferably filled with an inert gas (e.g., $SF_6$). The heat exchanger comprises at least one heat exchanger inlet in fluid communication with the outlet orifice of the external casing of the article and at least one heat exchanger outlet in fluid communication with the inlet orifice of the external casing. Preferably, the apparatus and/or system also includes a gas conveying device in fluid communication with both the heat exchanger and the article. In this regard, the apparatus and/or system can include an inert gas (e.g., $SF_6$) that is contained or sealed (preferably under positive pressure) therein. As such, the apparatus and/or system can be filled with an inert gas (e.g., $SF_6$) and the free space defined by the external casing and the one or more lithium ion batteries is filled with the inert gas (e.g., $SF_6$). Such aspects, therefore, provide $SF_6$ (for example) in direct contact with the outside of the one or more lithium ion batteries (e.g., individual lithium ion battery cells or lithium ion battery packs).

FIG. 5 illustrates an apparatus according to certain aspects of the present disclosure. As shown in FIG. 5, an apparatus 500 according to certain aspects of the present disclosure can include an article 600 comprising an external casing 630 as well as inlet and outlet orifices 632, 634, respectively. The external casing 630 defines an interior compartment 640. The article includes one or more lithium ion batteries 610 housed or located within the interior compartment 640 of the article. In this regard, the external casing 630 and the one or more lithium ion batteries (e.g., individual lithium ion battery cells or lithium ion battery packs) 610 define a free space 650 therebetween. This free space is preferably filled with an inert gas (e.g., $SF_6$). The apparatus 500 also includes a heat exchanger (e.g., a radiator) 700 that is directly or indirectly in fluid communication with the article 600. As shown in FIG. 5, the heat exchanger 700 includes at least one heat exchanger inlet 710 that is in fluid communication with the outlet orifice 634 of the external casing 630 of the article 600 and at least one heat exchanger outlet 720 in fluid communication with the inlet orifice 632 of the external casing 630.

The apparatuses exemplified by FIG. 5 also include a gas conveying device 800 in fluid communication with both the heat exchanger 700 and the article 600. As showing in FIG. 5, the heat exchanger 700 can be provided in fluid communication with the article 600 via a first conduit 850 connecting said heat exchanger inlet 710 with said outlet orifice 634 of said external casing 630 and a second conduit 860 connecting said heat exchanger outlet 720 with said inlet orifice 632 of said external casing 630. The aspects illustrated by FIG. 5 include a gas conveying device 800 positioned in-line on the second conduit 860. In this regard, the $SF_6$ filling the free space 650 defined by the external casing 630 and the one or more lithium ion batteries 610 is in direct contact with the outer surfaces of the one or more lithium ion batteries. Preferably, the entire apparatus 500 is filled with $SF_6$ according to any of the manners described herein and the final pressure of the sealed apparatus should be at least slightly larger than the ambient pressure as discussed above.

The $SF_6$ in contact with the one or more lithium ion batteries 610, absorbs heat from said one or more lithium ion batteries and is conveyed into the heat exchanger 700 through conduit 850, cooled in the heat exchanger, and then conveyed back into the article 600 via an in-line gas conveying device 800. As such, the apparatus 500 continually circulates $SF_6$ to continually dissipate heat generated for released from the one or more lithium ion batteries 610. Although not shown in FIG. 5, the apparatus can include one or more check-valves to ensure flow of $SF_6$ occurs in only one direction through the apparatus (e.g., counter-clockwise in the aspects illustrated by FIG. 5). In this regard, the present disclosure also provides methods including steps of providing an apparatus filled with $SF_6$ according aspects discussed herein and conveying the $SF_6$ through the apparatus.

In yet another aspect, the present disclosure provides methods and articles for suppressing thermal runaway in a lithium-containing device, containing a fire, and/or extinguishing a fire. In certain implementations, the articles can comprise a sealable container (e.g., a generally rigid box structure, a generally flexible bag structure, etc.) in which sulfur hexafluoride gas (alone or mixed with other inert gases as discussed above) is located. The sealable containers can be open and closed as desired via at least one sealable opening. Preferably, the opening for the articles is positioned such that $SF_6$ does not escape from the sealable container then the container is open to the surrounding atmosphere. Articles according the certain aspects can be configured to accommodate or house a variety of commonly used portable consumer products (e.g., phones, laptops, tools, etc.). In the event that a consumer device or product experiences a thermal runaway (e.g., lithium-containing battery undergoes thermal runaway), the consumer device or product can be placed inside of the $SF_6$-containing article to suppress the thermal runaway and/or extinguish the fire. Accordingly, such articles can be structurally incorporated into a variety of vehicles including, for example, automobiles, aircraft, spacecraft, and watercraft. In certain other implementations, however, the article can be carried by an individual. In certain such implementations, for instance, an individual could carry onto flights such an article filled with $SF_6$ to provide a means to not only contain a fire from a lithium-containing battery but also extinguish the fire as the $SF_6$ can act on the lithium directly as previously discussed.

Accordingly, many portable consumer goods utilizing lithium-containing batteries include magnesium frames or cases. Magnesium is a highly reactive metal. Burning or molten magnesium metal reacts violently with water. Containing and extinguishing fires from such devices, therefore, can be particularly difficult without the use of $SF_6$ according to certain aspects of the present disclosure. $SF_6$ prevents the evaporation of magnesium by forming a thin protective film thereon thereby mitigating the initiation or spread of any magnesium fire started as a consequence to thermal runaway by a lithium-containing battery.

In accordance with certain aspects of the present disclosure, the articles comprise a sealable container that can be constructed from an anti-ballistic material, that is, a material that is capable of stopping a bullet or other similar high velocity projectile, e.g., shrapnel. Those skilled in the art would appreciate that suitable examples of anti-ballistic materials include: aramid or para-aramid fibers (e.g., DUPONT™ KEVLAR® aramid fibers commercially available from DuPont); polycarbonate (e.g., LEXAN® polycarbonate commercially available from SABIC Innovative Plastics); carbon-fiber reinforced composite materials; and/or metals such as steel, titanium, or like anti-ballistic materials. The sealable container may also or alternatively be constructed from a fire-proof material, such as a material that is impervious or resistant to fire and/or flame. Those skilled in the art would appreciate that suitable examples of fire- and/or flame-resistant materials include aramid or meta-aramid fibers (e.g., DUPONT™ NOMEX® fiber commercially available from DuPont); mineral fibers and man-made mineral fibers, including fiberglass, ceramic fibers, stone wool, or like fire-resistant and/or flame-resistant materials.

FIG. 6 illustrates an article including a sealable container according to certain aspects of the present disclosure. The particular implementations illustrated in FIG. 6 comprise a sealable container 900 in the form of a generally rigid box structure including a sealable opening 910 and a lid structure 911 configured to close the sealable opening. These implementations also include locking components 915 (e.g., latches) that maintain the lid structure 911 in a closed position when desired (e.g., after a lithium-containing device that is smoking or on fire has been deposited in the container 900). As shown in FIG. 6, the generally rigid box structure defines an interior area 920 filled with $SF_6$ (alone or mixed with other inert gases).

FIG. 7 illustrates an article including a sealable container comprising bag, such as a flexible bag, according to certain aspects of the present disclosure. The particular implementations illustrated in FIG. 7 comprise a sealable container 900 in the form of a bag, such as a generally flexible bag structure, including a sealable opening 910 and an opening/closing structure 912 (e.g., zipper, etc.) configured to close the sealable opening. The opening/closing structure 912 can be slidably moved as indicated by the double-pointed arrow on FIG. 7 to open and close the container as desired. For instance, the container can remain closed until a lithium-containing device begins to experience a thermal runaway (e.g., overheat, emit smoke or fire, etc.) at which time the opening/closing structure 912 can be slidably moved to open the container and the lithium-containing device 924 experiencing the thermal runaway can be deposited into the interior area 920 of the container 900. The interior area 920 is filled with $SF_6$ (alone or mixed with other inert gases). If desired, the opening/closing structure 912 can be slidably moved to re-close the container and completely enclose the lithium-containing device therein.

In this regard, aspects of the invention also provide methods for suppressing thermal runaway in a lithium-containing device, containing a fire, and/or extinguishing a fire comprising contacting an electrolyte release from the lithium-containing device with an inert gas $SF_6$ (alone or mixed with other inert gases) and dissipating an ambient temperature of the electrolyte release. In certain implementations, the lithium-containing device comprises a lithium-containing battery, a container (e.g., a sealable container) housing a lithium-containing battery. In accordance with certain aspects of the present disclosure, the articles comprise a sealable container that can be constructed from an anti-ballistic material. Those skilled in the art would appreciate that suitable examples of anti-ballistic materials include: aramid or para-aramid fibers (e.g., DUPONT™ KEVLAR® aramid fibers commercially available from DuPont); polycarbonate (e.g., LEXAN® polycarbonate commercially available from SABIC Innovative Plastics); carbon-fiber reinforced composite materials; and/or metals such as steel, titanium, or like anti-ballistic materials. The sealable container may also or alternatively be constructed from a fire-proof material, such as a material that is impervious or resistant to fire and/or flame. Those skilled in the art would appreciate that suitable examples of such fire- and/or flame-resistant materials may additionally include aramid or meta-aramid fibers (e.g., DUPONT™ NOMEX® fiber commercially available from DuPont); mineral fibers and man-made mineral fibers, including fiberglass, ceramic fibers, stone wool, or like fire-resistant and/or flame-resistant materials.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A container for holding a plurality of lithium-containing devices, the container including an interior space housing a plurality of lithium-containing devices therein, at least one orifice in direct communication with the interior space, and an inerting gas comprising sulfur hexafluoride that is in direct contact with the lithium-containing devices, wherein each of the lithium-containing devices includes an outer casing, wherein the inerting gas fills a volume space of the interior space that is defined by said outer casings, and wherein the at least one orifice is configured to place the inerting gas in direct contact with the lithium-containing devices within the outer casings.

2. The container of claim 1, wherein the lithium-containing devices comprise lithium-containing batteries.

3. The container of claim 1, wherein the container includes a sealable lid.

4. The container of claim 1, wherein the at least one orifice comprises an inlet orifice and an outlet orifice.

5. The container of claim 1, wherein the container comprises a rigid container having a sealable lid.

6. The container of claim 1, wherein the container comprises a flexible bag having a sealable lid.

7. The container of claim 3, wherein the sealable lid comprises a zipper.

8. The container of claim 1, wherein the sulfur hexafluoride is mixed with other inert gases.

9. The container of claim 4, wherein the inlet orifice, outlet orifice, or both independently comprise a valve, capable port, or combination thereof.

10. A method of transporting a plurality of lithium-containing devices, the method comprising:
introducing the plurality of lithium-containing devices into an interior space of a container, wherein each of the lithium-containing devices includes an outer casing;
sealing the container to enclose the lithium-containing devices therein;
introducing sulfur hexafluoride into the interior space of the container and in direct contact with the lithium-containing devices within the outer casings via at least one outlet; and
transporting the sealed container containing the lithium-containing devices and sulfur hexafluoride from a first location to a second location,
wherein the sulfur hexafluoride fills a volume space of the interior space that is defined by said outer casings.

11. The method of claim 10, wherein the step of introducing the plurality of lithium-containing devices into an interior space of a container further comprises introducing a plurality of lithium-containing batteries into said interior space.

12. The method of claim 10, wherein the sulfur hexafluoride is introduced into the interior space of the container prior to sealing the container.

13. The method of claim 10, further comprising the steps of:
removing the sulfur hexafluoride from the interior space of the container to a storage container;
removing at least one lithium-containing device from the interior space of the container;
resealing the container; and
reintroducing the sulfur hexafluoride into the interior space of the container.

14. The method of claim 10, further comprising the step of reacting the sulfur hexafluoride with an electrolyte released from the plurality of lithium-containing devices to produce a non-volatile lithium sulfide.

15. The method of claim 10, further comprising evacuating air from the interior space of the container prior to introducing sulfur hexafluoride into the interior space of the container.

16. The method of claim 10, wherein the method is performed on an aircraft.

17. The method of claim 10, wherein the container comprises a material that is anti-ballistic and/or fire-flame resistant.

18. The method of claim 10, wherein each of the plurality of lithium-containing devices is a phone, laptop, or tool.

19. The container of claim 1, wherein the container comprises a material that is anti-ballistic and/or fire-flame resistant.

20. The method of claim 10, wherein the sulfur hexafluoride is mixed with other inert gases.

* * * * *